United States Patent [19]

Anderson

[11] Patent Number: 4,731,715

[45] Date of Patent: Mar. 15, 1988

[54] LAMP SHADE COVER

[76] Inventor: Edwin G. Anderson, 2508 N. Locust, Denton, Tex. 76201

[21] Appl. No.: 412,495

[22] Filed: Aug. 30, 1982

[51] Int. Cl.[4] .................... H02B 1/02

[52] U.S. Cl. .................... 362/352; 362/357; 362/358; 362/361; 362/806; 362/356

[58] Field of Search .................... 362/352, 357, 358, 361, 362/313, 356, 360

[56] References Cited

U.S. PATENT DOCUMENTS

| | | | |
|---|---|---|---|
| 1,989,931 | 2/1935 | Johnson | 362/361 X |
| 2,173,547 | 9/1939 | Burke | 362/358 |
| 2,264,255 | 11/1941 | Burke | 362/356 |
| 2,302,266 | 11/1942 | Sher | 362/358 |
| 3,385,963 | 5/1968 | Washick | 362/357 |
| 3,745,332 | 7/1973 | Weisbrod | 362/357 |
| 4,275,434 | 6/1981 | Borowitz | 362/352 |
| 4,290,099 | 9/1981 | Vicars-Harris | 362/352 |
| 4,354,222 | 10/1982 | Gall | 362/352 |
| 4,383,291 | 5/1983 | Gall | 362/356 |

FOREIGN PATENT DOCUMENTS

| | | | |
|---|---|---|---|
| 888532 | 9/1953 | Fed. Rep. of Germany | 362/352 |

*Primary Examiner*—Peter A. Nelson
*Attorney, Agent, or Firm*—Dennis T. Griggs

[57] ABSTRACT

A covering for a lamp shade diffuser is disclosed. A conformable covering is prepared from a rectangular swatch of cloth. The top and bottom side edges of the swatch are hemmed to provide casing pockets which extend along the length of the swatch. A draw string is received in the upper casing pocket, and an elastic band is received in the lower casing pocket. The hemmed portion forming the lower casing pocket is gathered and stitched so that the relaxed length of the elastic band substantially exceeds the stitched length of the gathered hem. The ends of the rectangular swatch of cloth are sewn together to produce a tubular covering. The draw string is tensioned until the top of the covering is slightly smaller in diameter than the top of the lamp shade. The lamp shade is inserted into the tubular covering and the elasticized hem is positioned around and under the lower edge of the shade, thereby defining an underlap. The draw string is tied off and the bottom is adjusted to provide an equal radial underlap around the lower edge of the shade.

4 Claims, 5 Drawing Figures

LAMP SHADE COVER

BACKGROUND OF THE INVENTION

1. Field of the Invention

This invention relates generally to home furnishing accessories, and in particular to a covering for a lamp shade diffuser.

2. Description of the Prior Art

Lamp shades are typically constructed of relatively stiff but lightweight materials and usually can be installed and removed from a lamp base with minimum effort. After an extended period of use, the shade may become outdated or discolored so that replacement is desirable. An exact lamp shade replacement, in some cases, may not be possible. On other occasions, it may be desirable to coordinate the appearance of the lamp shade with other room furnishings such as curtains, bed linen, pillows and the like. The range of conventional lamp shade pattern and colors which are available for such fashion coordination is limited, and is generally expensive.

It is known to provide a fabric covering as a solution to the problem of lamp shade replacement. Such coverings have heretofore been serviceable in most respects but have not provided a satisfactory pleated appearance. Moreover, because of variations in lamp shade diameter and taper, it has been necessary to customize each such covering according to the specific dimensions of each individual lamp shade.

OBJECTS OF THE INVENTION

It is, therefore, the principal object of the present invention to provide a conformable lamp shade cover which is adjustable to accomodate lamp shade size variations.

A related object of the invention is to provide a conformable lamp shade cover having a pleated appearance.

Yet another object of the invention is to provide an improved lamp shade cover which can be prepared from a rectangular swatch of cloth.

SUMMARY OF THE INVENTION

A covering for a lamp shade diffuser is prepared from a rectangular swatch of cloth. The top and bottom side edges of the swatch are hemmed to provide casing pockets which run along the length of the swatch. A draw string is received in the upper casing pocket, and an elastic band is received in the lower casing pocket. The cloth portions forming the hem and the lower casing pocket are gathered and stitched around the elastic band so that the length of the elastic band exceeds the stitched length of the gathered hem. The ends of the rectangular swatch of cloth are sewn together to produce a tubular covering. The lamp shade is inserted into the tubular covering, with the elasticized hem being expanded while the tubular cover is pulled over the lamp shade. The elasticized hem is positioned around and under the lower edge of the shade, thereby defining an underlap. The top hem is pulled over the upper edge of the lamp and the draw string is tensioned until the top of the cover is slightly smaller in diameter than the top of the shade being covered. The draw string is tied off and the bottom underlap is adjusted to provide an equal distance around the bottom diameter of the shade.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawings.

DETAILED DESCRIPTION OF THE PREFERRED EMBODIMENT

Figure 1:
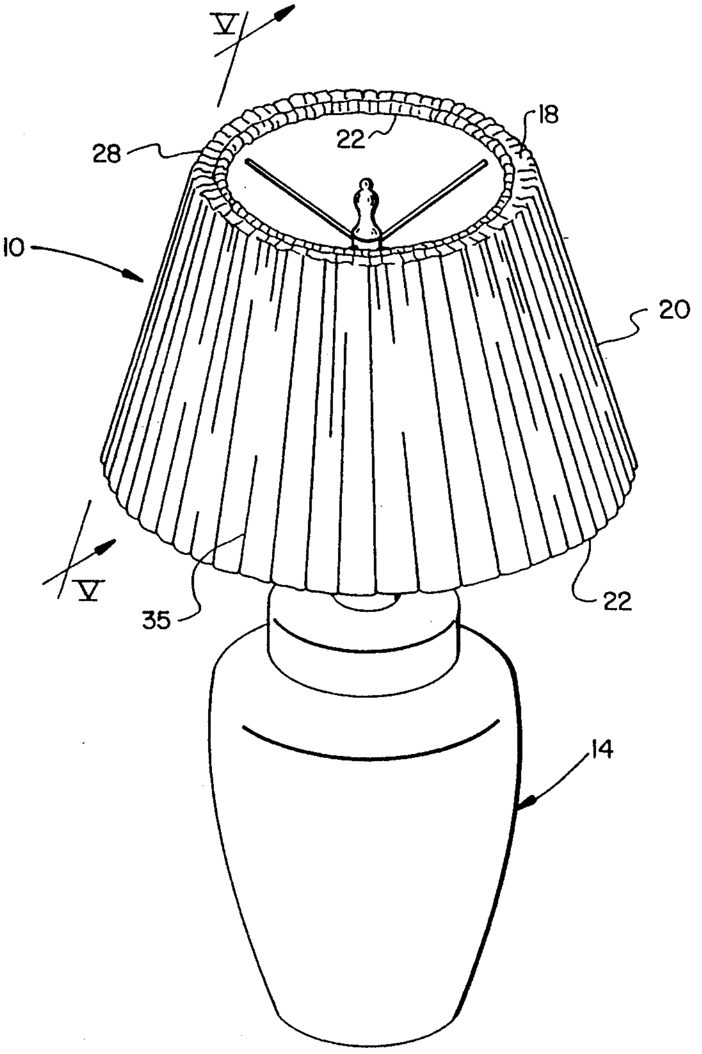
FIG. 1 is a perspective view of a lamp having a lamp shade decorated with a lamp shade covering constructed according to the teachings of the present invention.

In the description which follows, like parts are marked throughout the specification and drawings with the same reference numerals, respectively. The drawings are not necessarily to scale and in some instances proportions have been exaggerated in order to more clearly depict certain features of the invention.

Figure 5:
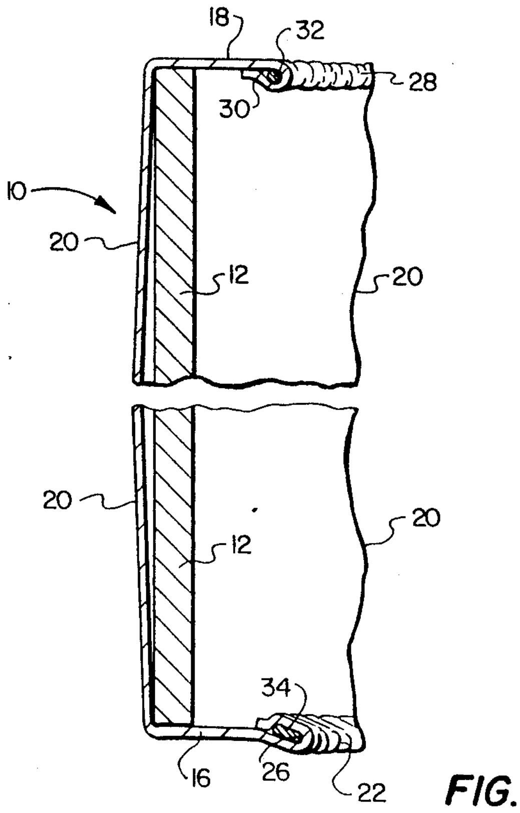
FIG. 5 is a sectional view of the installed lamp shade cover as illustrated in FIG. 4.

Referring now to FIGS. 1 and 5, a lamp shade cover 10 is shown assembled onto a lamp shade 12 which is affixed onto a conventional lamp base 14. The lamp shade cover 10 includes an underlap 16, an overlap 18 and an intermediate sidewall portion 20.

According to an important feature of the invention, the underlap 16 is hemmed along a stitch line 24A adjacent the lower edge 22 thereby defining a casing pocket 26. The overlap 18 is stitched along a stitch line 24B adjacent the upper edge 28, thereby defining a casing pocket 30. Although a single fold hem is illustrated, a double-fold can be used to good advantage.

The adjustable feature of the invention is provided by the combination of a draw string 32 which is received within the casing pocket 30 and an elastic band 34 which is received within the casing pocket 26.

According to an important feature of the invention, the hemmed portion 22 forming the lower casing pocket 26 is gathered and stitched so that the relaxed length of the elastic band 34 substantially exceeds the stitched length of the gathered hem. According to this arrangement, the bottom hem 22 is elasticized to provide a snug fit around the lower end of the lamp shade 12, and also to produce pleats 35 along the length of the covering.

Figure 3:
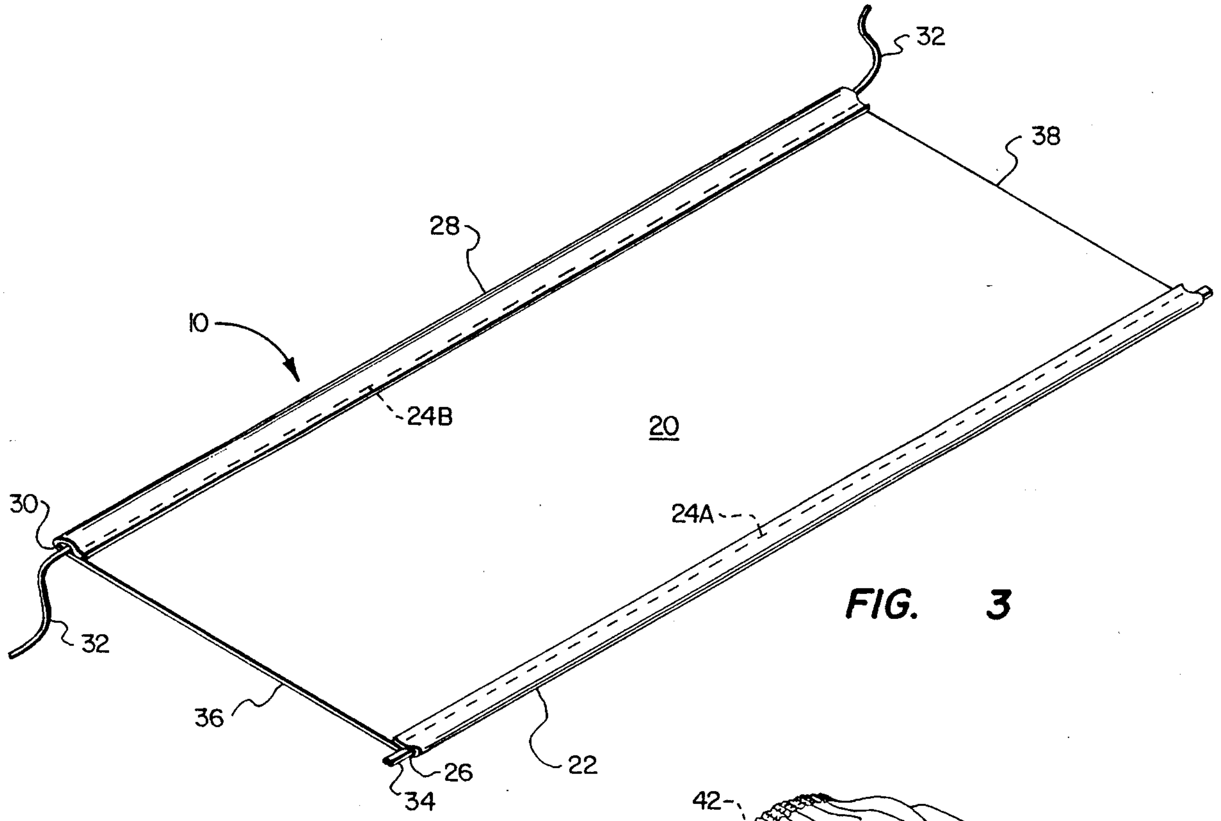
FIG. 3 is a rectangular cut-out taken from the swatch shown in FIG. 2 which has been partly assembled into a lamp shade cover.
Figure 4:
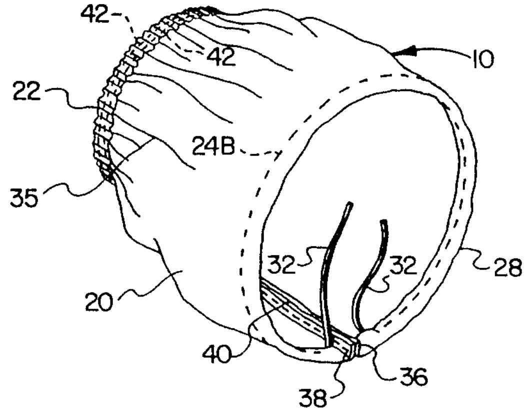
FIG. 4 is a perspective view of a lamp shade cover which is ready to be installed on a lamp shade.

After the casing pockets 26, 30 have been formed as shown in FIG. 3, the opposite ends 36, 38 of the lamp shade cover 10 are stitched together to form a stitched seam 40, and thereby producing a tubular enclosure or covering as illustrated in FIG. 4.

After the seam 40 has been stitched, the material forming the casing pocket 26 in which the elastic band 34 is received is gathered and stitched on opposite sides of the elastic band 34 as indicated by the dashed lines 42. According to this arrangement, the elastic band 34 can expand freely, while extension of the gathered material in the hem 22 is limited, thereby preserving the pleated appearance.

Figure 2:
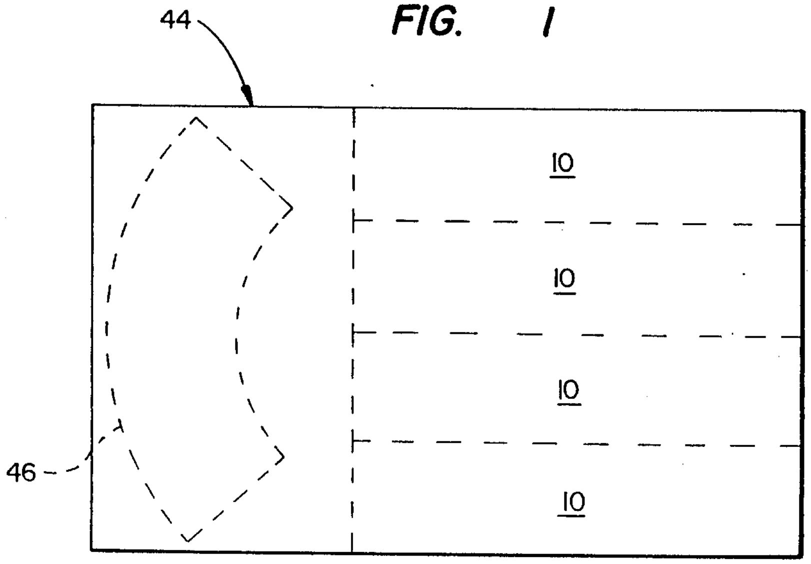
FIG. 2 is a top plan view of a rectangular swatch of cloth which illustrates two cut-out patterns for constructing the lamp shade cover shown in FIG. 1.

The lamp shade cover 10 is preferably cut in rectangular form from a large swatch of cloth 44 as illustrated in FIG. 2. However, if desired, a lamp shade cover can be prepared from a swatch of cloth having curved sides as indicated by the dashed pattern 46. It will be appreciated, however, that the curved pattern 44 does not make efficient use of the available material, whereas the rectangular pattern 10 does.

Referring again to FIGS. 1 and 4, the lamp shade cover 10 is assembled by holding the ends the draw string 32 and making the first loop of a square knot to prevent loosing either end in the casing pocket 30. Both ends of the draw string 32 are pulled until the top edge 28 of the cover 10 approximates the top diameter of the shade 12. After the lamp shade has been placed on a flat surface, the elasticized bottom edge 22 of the cover 10 is pulled over the sides of the shade until the elasticized edge snaps under the entire bottom diameter of the shade. The top overlap 18 of the cover is adjusted until it assumes a slightly smaller diameter than the top of the lamp shade. The preliminary square knot loop is loosened or tightened to obtain the desired top diameter. The bottom underlap 16 is adjusted until it assumes as equal radial distance around the bottom diameter of the shade. The diameter of the bottom edge 22 is adjusted by drawing the excess height of the cover to the bottom in order to maintain the desired overlap margin 18 along the top of the lamp shade. The second loop of the square knot is then accomplished, with care being taken to perserve the desired underlap 16 and overlap 18 of the cover. After the square knot has been secured, the pleating 35 is adjusted and straightened as necessary. The pleating, overlap and underlap can be adjusted, if necessary, by releasing the second loop of the square knot. After the pleatings, overlap and underlap are properly adjusted, the square knot is securely tightened, and the balance of the draw string ends 32 are severed.

At this point, the lamp shade covering 10 is ready to be placed onto the lamp shade 12. Final pleating adjustments are made by simply rotating the fabric around the top diameter and pulling the elasticized hem 22 accordingly. It will be appreciated that the lamp shade cover 10 can be easily removed for cleaning and reinstalled by expanding the elasticized bottom hem 22 and snapping it over the shade from top to bottom. It will usually not be necessary to adjust the draw string 32 since the proper upper diameter of the lamp shade cover is already established.

Although preferred embodiments of the invention have been described in detail, it should be understood that various changes, alterations and substitutions can be made therein without departing from the spirit and scope of the invention as defined by the appended claims.

What is claimed is:

1. A lamp shade cover comprising a conformable panel member having a top edge portion, a bottom edge portion, a flexible sidewall member disposed intermediate said top and bottom edge portions, an elongated elastic member coupled to said flexible sidewall member along substantially the entire length of said bottom edge portion and a draw string coupled to said flexible sidewall member along said top edge portion, said top edge portion including a casing pocket extending along said top edge portion, and said draw string being received in said top edge casing pocket.

2. A lamp shade cover as defined in claim 1, wherein said conformable panel member is prepared from a substantially rectangular swatch of fabric.

3. A lamp shade cover as defined in claim 1, said bottom edge portion including a casing pocket extending along said bottom edge, and said elastic member being received in said bottom edge casing pocket, the portions forming said bottom edge casing pocket being gathered and stitched whereby the relaxed length of the elastic member substantially exceeds the stitched length of the gathered pocket.

4. A lamp shade cover as defined in claim 1 wherein said top edge portion and said bottom edge portion are adjustable to provide selected amounts of overlap and underlap at the respective top and bottom portions of a lamp shade on which the lamp shade cover is disposed.

* * * * *